Nov. 1, 1932.  R. MALCOM  1,885,744
WELDER'S DEVICE
Filed Jan. 15, 1931
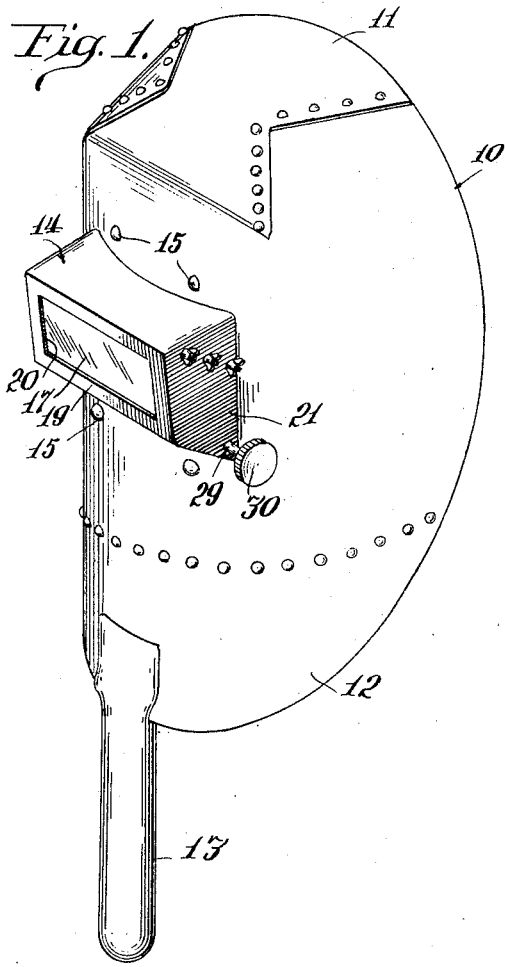
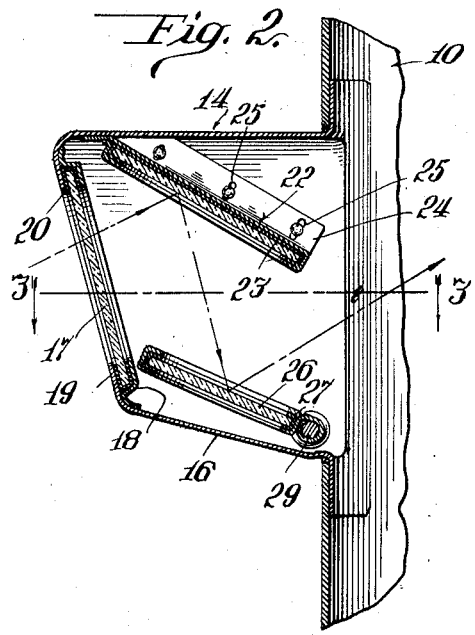
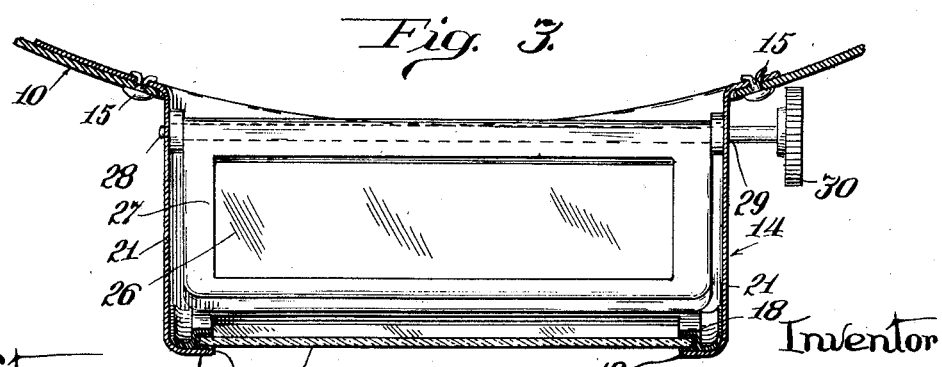
Witnesses
Milton Lenoir
Inventor
Robert Malcom
By George Heideman
Attorney Patented Nov. 1, 1932

1,885,744

UNITED STATES PATENT OFFICE

ROBERT MALCOM, OF CHICAGO, ILLINOIS

WELDER'S DEVICE

Application filed January 15, 1931. Serial No. 508,894.

My invention relates to a protective device, either in the form of a shield or helmet, to be used by welders for shielding the eyes and face from injurious light-rays.

My invention has for its object the provision of a device which will afford proper protection for the welder's eyes while performing the welding operation, while at the same time enabling the user to have a clear or proper vision of his surroundings or of other objects while in the vicinity of the welding torch or flame without removing or lowering the device out of face and eyes protecting position.

The objects and advantages of my invention will be more fully comprehended from the following detailed description of the accompanying drawing, wherein:—

Figure 1 is a perspective view of my improved device in the form of a shield.

Figure 2 is a vertical sectional view of the fenestral portion of the device.

Figure 3 is a cross sectional view taken substantially on the line 3—3 of Figure 2 as viewed by the arrows.

My invention relates to a device especially intended for protecting the face and eyes of a welder from injurious light-rays, while at the same time permitting the welder to have proper vision of objects beyond or out of line with the welding torch or flame while still in the injurious light zone of the welding torch or flames, and thus enable him to properly place or replace the finished or welded article with the next article to be welded, without the need of improperly uncovering his face and eyes while in the immediate vicinity of the welding flame.

In the particular exemplification, the invention is shown in the form of a welder's shield, the body portion 10 being formed of any suitable heat resisting material, such as fibre board, bowed into the arcuate form shown in Figure 1 so as to provide a top portion 11 which may extend over the forward portion of the head; and provided with a bottom portion 12 to cover the lower part of the face and the neck of the user. The bottom portion is shown provided with a suitable handle 13 secured to the body portion in any suitable manner.

The forward part of the body portion intermediate of the top and bottom is cut away to provide a transversely disposed sight opening which is provided with a suitable metallic frame having top, bottom and side walls to form a suitable housing 14 disposed forward of the body portion of the shield. This housing 14 is of suitable depth and preferably rectangular as shown, with the top, bottom and side walls preferably disposed through the opening in the shield and the walls flanged to lap the inner side of the shield to which it may be secured in any suitable manner as by rivets as shown at 15 in Figure 3, so as to exclude light.

The lower or bottom wall 16 of the housing 15 is shown slightly shorter than the upper wall in order to provide a front sloping lens holding portion as shown.

The forward end of the housing is suitably formed to hold a protection lens or glass 17. In the particular exemplification the lens 17 is shown mounted in a channeled frame 18 which may be secured in any suitable manner to the front wall 19 of the housing; the front wall 19, being, of course, provided with an opening 20 of proper size.

Secured to each side wall 21 of the housing 14 adjacent to the top thereof, is a glass holding frame 22. The frames 22 are arranged transversely of the housing in a downwardly sloping manner toward the rear or body portion of the shield as shown in Figure 2.

The frames 22 are made to hold a piece of glass 23 of length and width substantially equal to that of the outer lens 17. The frames 22 are each provided with a flange as at 24 and provided with slots at 25 to receive small bolts preferably provided with thumbs or wing nuts whereby the frame is adjustably secured to the side walls 21 of the housing. With this arrangement, the glass 23 may be arranged at or adjusted to a suitable angle relative to the outer lens 17 in keeping with the desires and manner of use of the operator.

The lower part of the housing 14 is also provided with a glass 26 which is mounted in a frame 27; the glass 26 being also disposed transversely of the housing and of size corresponding substantially to that of the glass 23.

The frame 27 is pivotally secured at one longitudinal side to the housing side walls at 28 and 29, namely at the inner longitudinal side of the frame 27; and the pivot pins either one or both extended to the outside of the housing. In the construction shown, the pivot pin 29 is shown extended and its outer end provided with a finger grasping disc or button 30. With this arrangement, it is apparent that the glass holding frame 27 and likewise glass 26 may be adjusted by swinging the outer free longitudinal side thereof—namely the side adjacent to lens 17—upwardly or downwardly in keeping with the adjustment of the glass 23 and in keeping with the operator's needs.

The object of my invention is to provide a device whereby the welder is not required to look directly at the place where the weld is being made and therefore is not compelled to look directly at the bright welding flame, but is given an indirect or reflected view without the injurious eye straining effect.

In use, the operator holds the device so that the glass 23 is disposed toward or substantially toward the welding flame and point of operation, in order that the incident rays will be properly reflected onto glass 26, which latter in turn provides the operater with a proper projection or vision of the operation, but without the injurious effect on the eyes. It will be understood that glass 26 is not a coated mirror type but ordinary or a frosted glass or suitable metal plate which provides a subdued or dull reflection of sufficient clarity to permit proper operation.

With my improved device, a welder is relieved of the severe eye-strains usually encountered as he is not compelled to look directly at the welding flame and operation, but has an indirect vision of the operation. Furthermore, with my improved protector or shield, the welder is permitted to have clear vision of other objects or devices on which a welding operation is to be performed and which may be located in the vicinity of his operations, thus enabling him to properly grasp and arrange his work without the necessity of removing the protector or shield and subjecting himself to the injurious light-rays.

In view of the fact that my improved device affords an indirect vision of the welding operation, the lens 17 need not therefore be of the extremely dark colored type but may be such as to afford clear vision beyond the welding flame.

While I have shown and described the reflecting members 23 and 26 as consisting of glass, it is apparent that any suitable metal may be used, of a type which will not produce a bright or glaring reflection; and although I have chosen to illustrate the invention as applied to a hand shield, it is evident that the invention is equally adapted for use with masks or goggles; the invention having been described in terms employed merely as terms of description and not as terms of limitation, as structural modifications are possible and may be made without, however, departing from the spirit of my invention.

What I claim is:

A welder's device of the character described comprising a main body portion provided with an opening in the front wall, a housing disposed entirely about said opening and open at the front and rear thereof, a protection lens mounted across the open front, a pair of frame members removably secured to the opposite side walls within the upper end of the housing so as to slope downwardly toward the opening in the main body portion, means whereby said frame members are clamped in place and limited adjustment of the frame members permitted, a reflecting element supported at its ends by said frame members, a frame disposed transversely within the housing adjacent to the bottom thereof and pivotally secured at its rear end to the side walls of the housing so as to permit vertical swinging movement, a non-glare reflecting element mounted in said frame, and means disposed through the side of the housing whereby the frame may be tilted about the pivot of the frame.

ROBERT MALCOM.